United States Patent
Tobin et al.

(10) Patent No.: US 7,055,737 B1
(45) Date of Patent: Jun. 6, 2006

(54) ELECTRONIC NETWORK AND METHOD FOR OBTAINING TOPIC-SPECIFIC INFORMATION REGARDING A PRODUCT

(75) Inventors: Christopher M. Tobin, Central Valley, NY (US); Brian Siegel, Washingtonville, NY (US); Philip M. Abram, Warwick, NY (US); Marc Beckwitt, San Clementi, CA (US); Gregory D. Gudorf, San Diego, CA (US); Kazuaki Iso, Oradell, NJ (US); Brian Raymond, San Diego, CA (US)

(73) Assignees: Sony Coporation, Tokyo (JP); Sony Electronics, Inc., Park Ridge, NJ (US)

( * ) Notice: Subject to any disclaimer, the term of this patent is extended or adjusted under 35 U.S.C. 154(b) by 740 days.

(21) Appl. No.: 09/799,227

(22) Filed: Mar. 5, 2001

Related U.S. Application Data (60) Provisional application No. 60/213,113, filed on Jun. 22, 2000.

(51) Int. Cl.
*G06F 17/00* (2006.01)

(52) U.S. Cl. ............... 235/375; 235/383; 235/385

(58) Field of Classification Search ............... 235/375, 235/486, 449, 383, 385; 705/16, 27, 23, 705/14
See application file for complete search history.

(56) References Cited

U.S. PATENT DOCUMENTS

| | | | |
|---|---|---|---|
| 5,047,614 A | 9/1991 | Bianco | 235/385 |
| 5,324,922 A | 6/1994 | Roberts | 235/375 |
| 5,506,395 A * | 4/1996 | Eppley | 235/486 |
| 5,754,681 A | 5/1998 | Watanabe et al. | 382/159 |
| 5,774,874 A | 6/1998 | Veeneman et al. | 705/27 |
| 5,844,808 A * | 12/1998 | Konsmo et al. | 700/244 |
| 5,869,819 A | 2/1999 | Knowles et al. | 235/375 |
| 5,905,248 A | 5/1999 | Russell et al. | 235/462 |
| 5,918,211 A | 6/1999 | Sloane | 705/16 |
| 5,918,214 A | 6/1999 | Perkowski | 705/27 |
| 5,933,829 A * | 8/1999 | Durst et al. | 707/10 |
| 5,938,726 A | 8/1999 | Reber et al. | 709/217 |
| 5,950,173 A | 9/1999 | Perkowski | 705/26 |
| 5,971,279 A | 10/1999 | Raistrick et al. | 235/472.01 |
| 5,978,773 A | 11/1999 | Hudetz et al. | 705/23 |
| 5,986,651 A | 11/1999 | Reber et al. | 345/335 |
| 5,992,752 A | 11/1999 | Wilz, Sr. et al. | 235/472.01 |
| 6,012,102 A | 1/2000 | Shachar | 710/5 |

(Continued)

*Primary Examiner*—Michael G. Lee
*Assistant Examiner*—Kimberly D. Nguyen
(74) *Attorney, Agent, or Firm*—Wood, Herron & Evans, LLP (57) ABSTRACT

A method of obtaining, from a remote location, topic-specific information regarding a product includes: electronically receiving one of a plurality of machine-readable codes electronically navigating to an information resource at a remote location; and displaying the information resource's topic-specific information about the product on an electronic display device. In further detail, each of the machine-readable codes is associated with an information topic relating to a product, with at least one machine-readable code having an associated information topic which is different from that of the other machine-readable code or codes. Also, each of the machine-readable codes encodes an identifier which is associated with a corresponding information resource at a remote location. At least one corresponding information resource includes topic-specific information about the product which is different from that of the other corresponding information resource or resources. In the electronic-navigation step, the corresponding information resource at the remote location is the resource associated with the identifier encoded by the machine-readable code.

35 Claims, 3 Drawing Sheets

U.S. PATENT DOCUMENTS

| | | | |
|---|---|---|---|
| 6,014,634 A | 1/2000 | Scroggie et al. | 705/14 |
| 6,027,024 A | 2/2000 | Knowles | 235/472.01 |
| 6,118,986 A * | 9/2000 | Harris et al. | 455/90 |
| 6,182,729 B1 * | 2/2001 | Banzawa et al. | 156/353 |

* cited by examiner

FIG. 3

ELECTRONIC NETWORK AND METHOD FOR OBTAINING TOPIC-SPECIFIC INFORMATION REGARDING A PRODUCT

CROSS-REFERENCE TO RELATED APPLICATION

This Application claims the benefit of the filing date of Provisional U.S. Patent Application No. 60/213,113 entitled "Automatic Shorthand Driven Internet Content Delivery" and filed on Jun. 22, 2000. The entire disclosure of U.S. Patent Application No. 60/213,113 is incorporated into this Application by reference.

BACKGROUND OF THE INVENTION

1. Field of Invention

This invention is directed to obtaining, from a remote location, information about a product, and, more particularly, to electronically obtaining, from a remote location, topic-specific information regarding a product.

2. Description of Related Art

When an Internet user uses the Internet to obtain information regarding a particular topic, usually the user wants to retrieve only the specific information which pertains to the given topic. Moreover, the user wants to obtain that information quickly.

Unfortunately, however, a user may not know the Uniform Resource Locator ("URL") which would lead to the desired information. Accordingly, a user may attempt to search for the URL using a search engine. In further detail, the user lists several key words and hopes that the search engine will return the desired URL. However, the search engine typically returns many "hits", in the form of URLs, which may or may not include the specific URL leading to the desired subject matter. In this situation, a user must take the time to sift through the irrelevant hits, all the while hoping to stumble across the desired URL and information.

At other times, a user may have the needed URL, but it may not be "handy". For example, the URL may be in a piece of product literature which has been filed away or misplaced. In such instances, the user must take the time to hunt down the product literature.

Even if an Internet user is fortunate enough to know the specific URL, the user knows that it takes time to key in the characters which make up the URL. Also, if the user makes a mistake while typing, the user may have to rekey the information, thereby further slowing down the process. Accordingly, given the typical Internet user's desire for quick data retrieval, the user would just as soon avoid having to enter a URL, altogether.

In an effort to address Internet users' desire for quick data retrieval, a system has been developed in which an Internet user may electronically scan a Uniform Product Code ("UPC") symbol into a local computer using a bar-code reader. The local computer then uses a modem and telephone link to send the bar-code data to an Internet service provider. The Internet service provider then accesses a relational database which lists several UPCs and several URLs, with a given UPC being associated with a single URL if the database has a URL for the given UPC. If the database has a URL which corresponds with the UPC provided by the user, the Internet service provider uses the telephone/modem link with the local computer to send the URL to the local computer in the form of a hypertext mark-up language ("HTML") document. This HTML document is displayed on the local computer, at which point the user may click on the URL, thereby triggering the local computer's Internet browser software to navigate to the information resource located at the particular URL. Alternatively, the local computer's browser software may automatically load the retrieved URL, ultimately displaying the information corresponding to that URL.

In an alternate form of the system discussed above, the particular URL which is associated with a given UPC is, itself, encoded in bar-code form using bar-code technology. The URL bar-code is printed on an item other than the product itself. In further detail, the URL bar-code is printed on a document which may be a magazine article, an advertisement, or other printed matter. If an Internet user has access to the particular document, then the user may scan the URL bar-code using a bar-code reader connected to the user's local computer. At this point, the URL bar-code data is transmitted via the modem/telephone link to the Internet service provider, at which point the service provider uses the encoded URL to navigate to the remote server and file identified by the URL. This information is then returned to the local computer as described above.

These systems provide one solution for an Internet user, in that the user does not have to key in a URL. However, these systems still do not address a user's desire to obtain just the relevant information and to obtain it quickly. In further detail, whether a user scans a UPC bar-code or a URL bar-code, the user still retrieves an information resource which is quite broad. The information resource may relate to the product, or it may not. For example, the retrieved information resource may simply be a website which presents the user with information regarding the company which manufactures the particular product. Even if the information resource is limited to information regarding the product, the user does not know what kinds of information about the product will be presented. It may be that the desired information is not even included in the information resource. In any event, in order to determine whether or not the particular, desired item of information has been retrieved, the user must parse through all of the information retrieved.

Accordingly, Internet users would benefit from a code-reading system for a given product which not only retrieves information quickly, but which also retrieves the desired information, and which retrieves the desired information without retrieving potentially-related, yet unwanted information.

SUMMARY OF THE INVENTION

The invention overcomes the above-mentioned drawbacks by providing an electronic network and method for obtaining, from a remote location, topic-specific information regarding a product.

The invention includes: electronically receiving one of a plurality of machine-readable codes which relates to an information topic regarding a product; electronically navigating to a corresponding information resource at a remote location; and displaying the corresponding information resource's topic-specific information about the product on an electronic display device.

In further detail, each of the machine-readable codes is associated with an information topic relating to a product, with at least one machine-readable code having an associated information topic which is different from that of the other machine-readable code or codes. Also, each of the machine-readable codes encodes an identifier which is associated with a corresponding information resource at a remote location. At least one corresponding information resource includes topic-specific information about the product which is different from that of the other corresponding information resource or resources. In the electronic-navigation step, the corresponding information resource at the remote location is the resource associated with the identifier encoded by the machine-readable code.

In one aspect of the invention, the machine-readable code is affixed to the product or to a container containing the product. In another aspect, the information topic associated with the machine-readable code includes a human-readable code which is in physical proximity to the machine-readable code. Typically, the human-readable code is in the form of words, letters, and/or numbers. One non-limiting example is a conventional human language, such as English, Japanese, French, German, or the like.

In a further aspect, the topic-specific information comprises one or more of installation information, registration information, warranty information, extended warranty information, trouble-shooting information, maintenance information, service information, specification information, update information, recall information, notice information, rebate information, coupon information, related-product information, incentive-program information, contest information, and discount information.

In another aspect, the identifier is related with a URL in a relational database. If desired, the relational database may reside on a remote computer. Also, the remote computer may send the URL to a local computer which navigates to the corresponding information resource. If desired, the local computer may navigate to the corresponding information resource automatically. In an alternate aspect of the invention, the relational database may reside on a local computer; and, if desired, the local computer may navigate to the corresponding information resource automatically.

In a further aspect, the identifier, which is associated with a corresponding information resource at a remote location, may be an encoded URL, itself. In this aspect, if desired, the step of electronically navigating to the corresponding information resource at the remote location may be performed automatically.

In another aspect of the invention, the receiving step includes electronically reading the machine-readable code using an electronic reader. If desired, the machine-readable code may include a bar-code, and the electronic reader may include a bar-code reader.

In yet a further aspect of the invention, the electronically-receiving, electronically-navigating, and displaying steps may be performed using a local computer. If desired, the local computer may include a personal-digital-assistant device ("PDA").

BRIEF DESCRIPTION OF THE DRAWINGS

The accompanying drawings, which are a part of this specification, illustrate various versions of the invention, and, together with the general description of the invention given above, and the detailed description of the drawings given below, help to explain the principles of the invention.

DETAILED DESCRIPTION OF THE DRAWINGS

Figure 1:
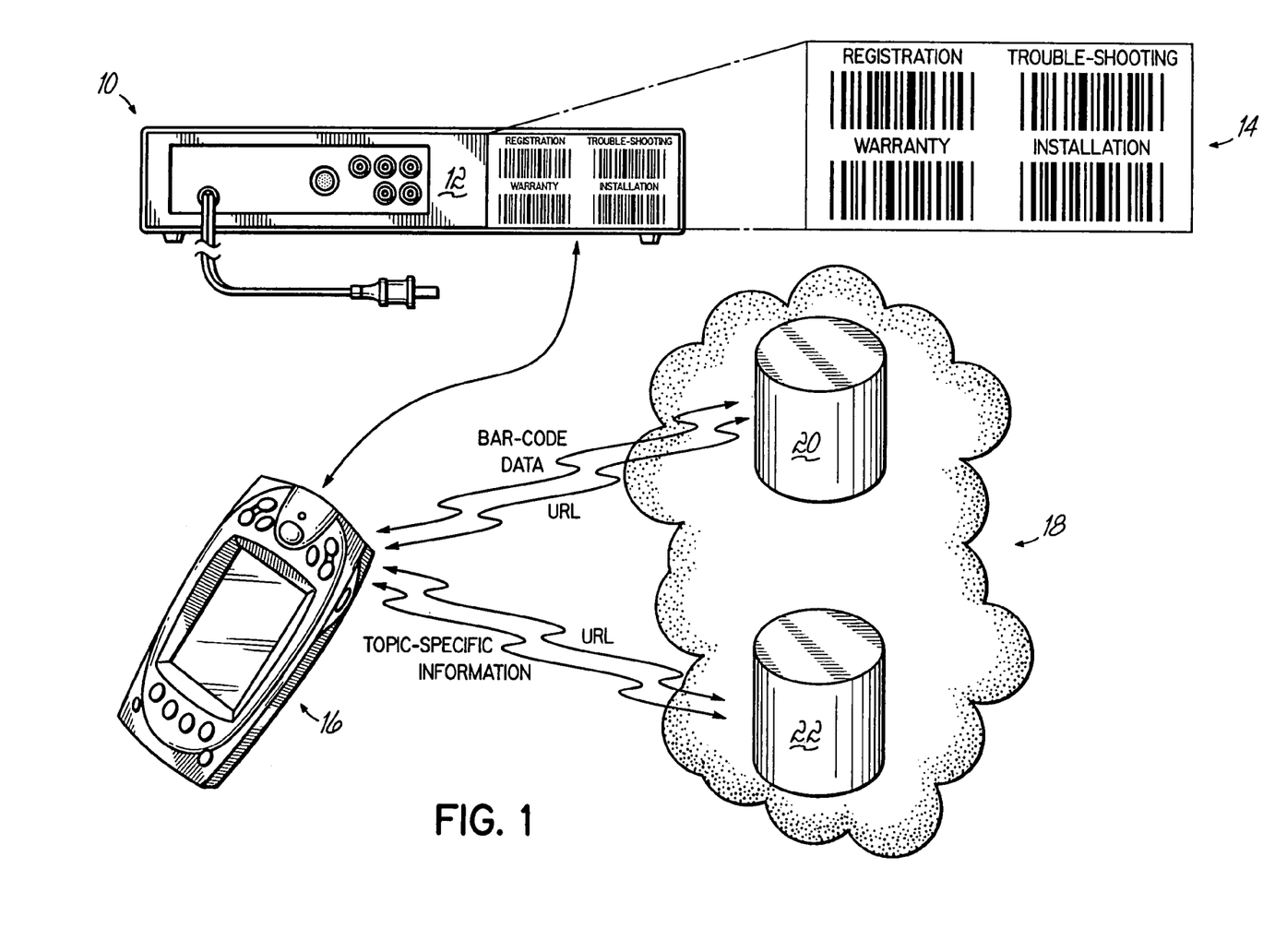
FIG. 1 is a schematic diagram which depicts one version of the invention.

With reference to FIG. 1, a user (not shown) wants to obtain product registration information regarding an audio-visual ("AV") component. Non-limiting examples of AV components include a digital-video-disc ("DVD") player, a compact-disc ("CD") player, a mini-disc player, and a home-theater receiver. The particular AV component shown in FIG. 1 is a DVD player 10 which the user has just purchased.

The back panel 12 of the DVD 10 player includes a listing 14 of words or phrases, with each word or phrase referring to a particular information topic associated with the DVD player 10. For example, as shown, the back panel 12 of the DVD player 10 includes the words "registration", "warranty", "installation", and "trouble-shooting". The back-panel listing 14 also includes a unique bar-code adjacent each one of these words, with each bar-code encoding an identifier which is associated with a corresponding information resource at a remote location. In further detail, the bar-code adjacent the word "registration" encodes an identifier associated with registration information, the bar-code adjacent the word "warranty" encodes an identifier which is associated with warranty information, and so on.

The listing 14 of words/phrases and bar codes may be positioned on the product at the time of manufacture, or may be provided to the user/owner at a later date. If the user owns a product which was made before the incorporation of a listing system, such as the listing 14, then the product manufacturer, retailer, or other entity may send a listing to the owner, which the owner may affix to the product. Likewise, if the product manufacturer or other affiliated entity wants to update the listing 14 (e.g., additional topics, new URLs, etc.), the entity may send an updated listing to the owner. If desired, the user may actively request such listings. For example, the user may, provide the model number for the DVD player, sending the information to the appropriate entity via postal mail, fax, phone, Internet (e.g., via the product manufacturer's website), or other suitable communication network. Alternatively, the manufacturer, retailer, or other entity likely will have the user/owner's contact information, and may send such listings without any prompt from the user/owner. Such listings may be sent to the product owner via any suitable communication network. For example, a "decal" having the listing information may be sent by postal mail. Alternatively, the listing may be sent electronically to the user, at which point the user may print the listing out on a local printer.

The user simply looks at the word or phrase adjacent each of the bar-codes and selects the desired word or phrase, and therefore, the desired bar-code. In this particular example, the user selects the word "registration" and its associated bar-code so that the user may obtain registration information regarding the DVD player 10. At this point, the user scans the registration bar-code using a personal-digital-assistant computer ("PDA") 16 which has both bar-code-reading and wireless-communication capabilities; and the PDA electronically receives (e.g., electronically reads) the machine-readable code. If desired, the user may use a PDA such as the PPT 2700 Pocket PC made by Symbol Technologies Inc. of Islip, N.Y.

Once the PDA 16 has read the registration bar-code, the PDA 16 transmits the bar-code data over the Internet 18 to a remote server 20. The PDA 16 executes the transmission using the PDA's central processing unit ("CPU") and software, including Internet browser software. The remote server 20 contains a relational database in which each of the topic-specific bar-codes provided on the DVD player 10 has been associated with a unique URL. The remote server 20 locates the unique URL associated with the registration bar-code, and transmits the URL over the Internet 18 back to the PDA 16.

At this point, depending upon how the user has configured the PDA 16, the PDA 16 either automatically navigates over the Internet 18 to a remote server 22 which hosts the registration-specific information, or waits for a prompt from the user to navigate to the server 22. In either event, once the server 22 has received this request for the registration-specific information, the server 22 sends the information to the PDA 16, where the information is displayed in hypertext mark-up language ("HTML") format. If desired, the registration information resource may be an interactive website. In this fashion, the user is not only able to view product registration information on the PDA 16, but also is able to complete a registration "form" by filling in the form which appears on the display of the PDA 16 using a stylus or the like. If the user wants a hardcopy of the registration information, they may transmit the appropriate data from the PDA 16 to an associated printer (not shown).

Figure 2:
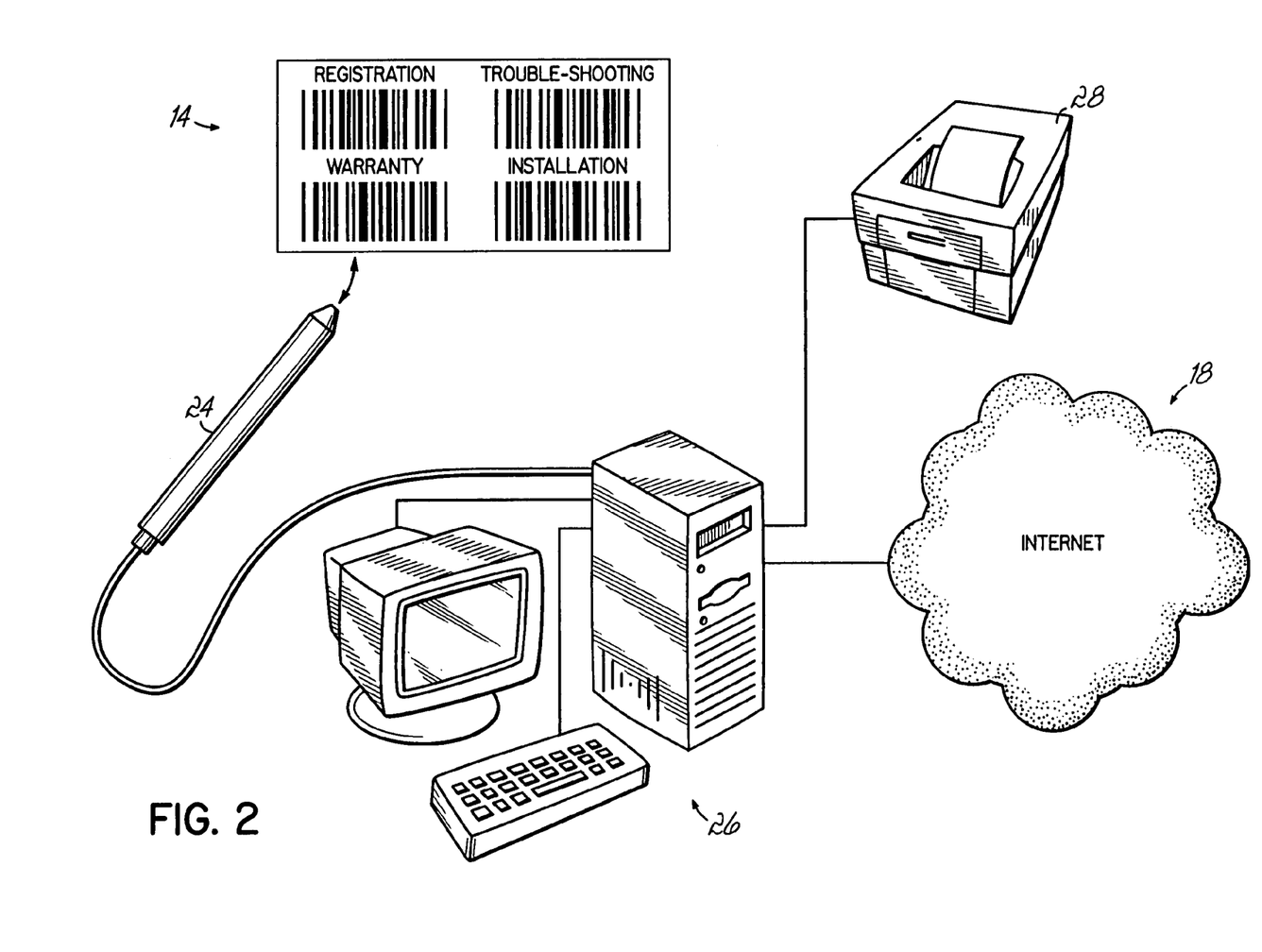
FIG. 2 is a schematic diagram which depicts another version of the invention.

With reference to FIG. 2, in another version of the invention, the user (not shown) obtains registration information regarding the DVD player (not shown) by scanning the registration bar-code on the listing 14 (on the back panel of the DVD player) with a commercially-available bar-code pen 24. The bar-code pen 24 is connected to a desktop personal computer ("PC") 26, which is connected to the Internet 18. The PC includes a system unit, a monitor, and a keyboard, with the system unit housing a central processing unit ("CPU"), memory, and resident software, including Internet browser software. In this particular version, the bar-code directly encodes the URL which specifies the location of the corresponding topic-specific information resource. Accordingly, there is no need for a relational database which links a given bar-code with a particular topic-specific URL. Instead, the user simply scans the registration bar-code using the bar-code pen 24, and the PC's Internet browser software uses the topic-specific URL to navigate to the registration information regarding the DVD player.

Depending upon the computer settings chosen by the user, the PC 26 either automatically navigates the Internet 18 to the information resource specified by the URL, or waits for a prompt from the user. Either way, the registration-specific information is retrieved from a remote location (not shown) on the Internet 18, and displayed on the PC 26 in the form of an HTML document.

In further detail, the back panel of the DVD player (not shown) includes a listing 14 of words or phrases, with each word or phrase referring to a particular information topic associated with the DVD player. For example, as shown, the back panel of the DVD player includes the words "registration", "warranty", "installation", and "trouble-shooting". The back-panel listing 14 also includes a unique bar-code adjacent each one of these words, with each bar-code encoding a URL which specifies the location of a corresponding information resource at a remote location. For example, the bar-code adjacent the word "registration" encodes the URL for the DVD-player registration information, the bar-code adjacent the word "warranty" encodes the URL for the DVD-player warranty information, and so on.

The user simply looks at the word or phrase adjacent each of the bar-codes and selects the desired word or phrase, and therefore, the desired bar-code. In this particular example, the user selects the word "registration" and its associated bar-code so that the user may obtain registration information regarding the DVD player 10. At this point, the user scans the registration bar-code using the bar-code pen 24, and the pen 24 transmits the encoded data to the PC 26.

Once the registration bar-code has been read into the pen 24 and received by the PC 26, the PC 26 uses the encoded URL to navigate the Internet 18 to a remote server (not shown) which hosts the registration-specific information. Once the remote server has received the request for the registration-specific information, the remote server sends the information to the PC 26, where the information is displayed in hypertext mark-up language ("HTML") format. If desired, the registration information resource may be an interactive website. In this fashion, the user is not only able to view product registration information on the PC monitor, but also is able to complete a registration "form" by using the PC keyboard to fill in the form which appears on the PC monitor. Also, the user may print out a hardcopy of the registration information on the printer 28 which is attached to the PC 26.

Figure 3:
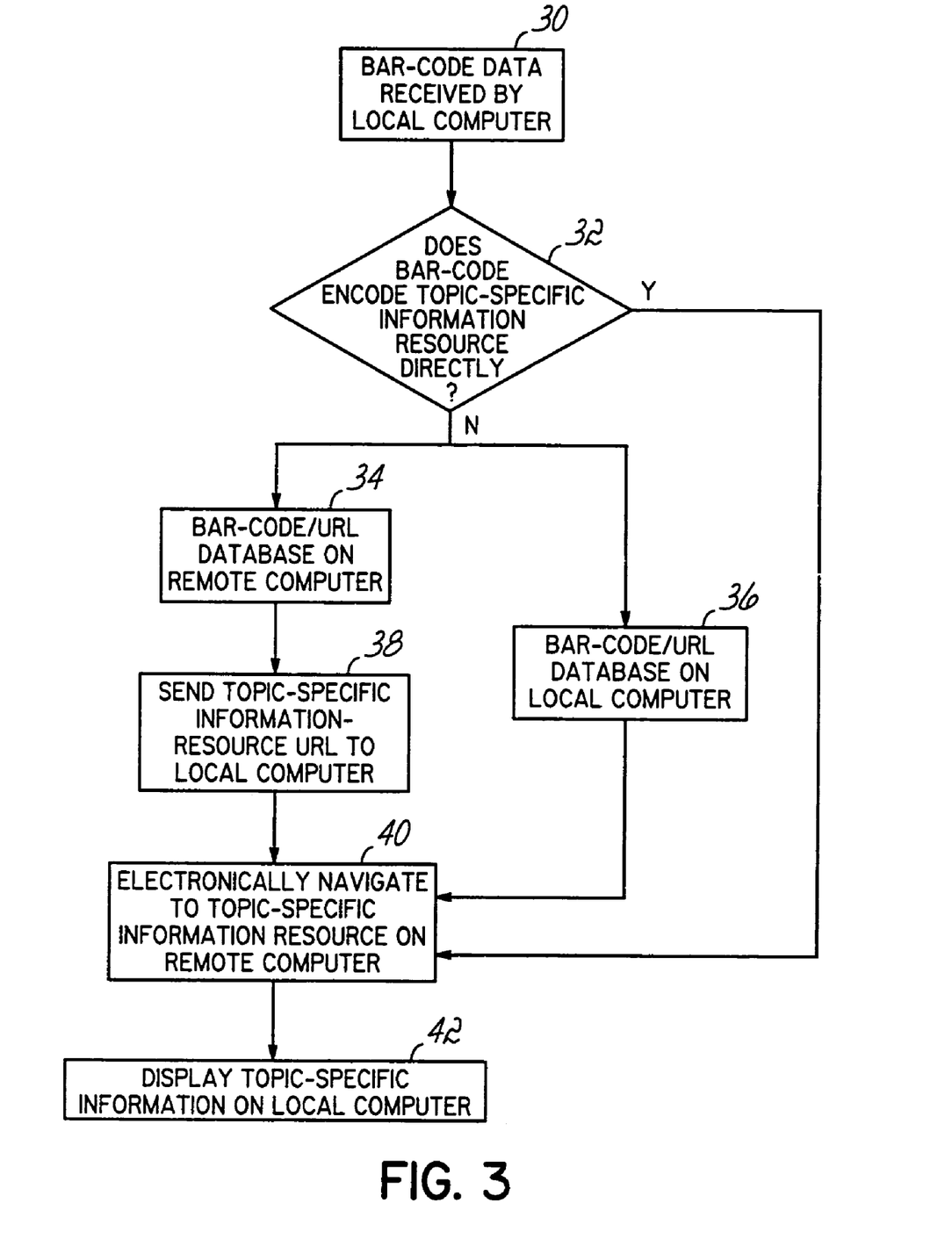
FIG. 3 is a flow chart depicting several aspects of the invention.

FIG. 3 is a flowchart which depicts several aspects of the invention. For example, in one step 30, topic-specific bar-code data is received by a local computer. At this point, the pathway followed in the flowchart of FIG. 3 depends on whether or not the bar-code directly encodes a URL which specifies the location of a particular topic-specific information resource regarding a particular product (See, reference no. 32). If the bar-code does not directly encode such a URL, then a relational database is used, with the relational database relating a given bar-code with a URL which does specify a particular location of a topic-specific information resource regarding the particular product.

If the relational database is located on a remote computer 34, then the local computer transmits the data contained in the bar-code to the remote computer, where the bar-code data is linked with the appropriate URL. At this point, the remote computer sends the topic-specific URL to the local computer 38, at which the local computer, using resident Internet browser software may electronically navigate to the location specified by the topic-specific URL 40. The topic-specific information regarding the particular product then may be sent to the local computer for display and viewing by a user 42.

In another aspect, if the relational database which associates bar-codes with corresponding topic-specific URLs, is located on the local computer 36, then once the local computer has received the bar-code data and correlated that data with the corresponding topic-specific URL, the local computer may electronically navigate to the topic-specific information resource on the remote computer 40, using the topic-specific URL. At this point, the remote computer may send the topic-specific information to the local computer 42, for display and use by the particular user.

In yet another aspect of the invention, where the bar-code directly encodes a topic-specific URL regarding a particular product 32, once the local computer receives the bar-code data 30, the local computer may electronically navigate to the particular location of the topic-specific information resource specified by the URL 40. At this point, the topic-specific information may be sent from the remote computer to the local computer for display and use 42.

The particular versions of the invention described above in connection with FIGS. 1-3 provide many benefits. For example, not only does the user obtain information quickly, but the user also obtains just the information they want, when they want it. In further detail, when the user is ready to register the product, they may swipe the registration bar-code, knowing that they will be connected with information regarding registration. Alternatively, if the user wants assistance in setting up the product, they may select the word "installation" and its corresponding bar-code, knowing that they will retrieve information focused on that specific topic. Unlike other techniques for obtaining information via the Internet, the user knows not only that they will retrieve relevant information, but also that the information will be targeted to a desired topic, thereby avoiding the need for the user to wade through screen after screen of unwanted information.

What is claimed is:

1. A method of obtaining, from a remote location, topic-specific information regarding a product, comprising the steps of:
    electronically receiving one of a plurality of bar codes associated with a product, each of the bar codes being associated with topic-specific information relating to the product, at least one of the bar codes for the product being associated with topic-specific information which is different from that of the other bar code or codes for the product, and each of the bar codes encoding an identifier which is associated with a corresponding information resource at a remote location, with at least one corresponding information resource including topic-specific information about the product which is different from that of the other corresponding information resource or resources;
    electronically navigating to the corresponding information resource at the remote location, the resource being the resource associated with the identifier encoded by the bar code; and
    displaying the corresponding information resource's topic-specific information about the product on an electronic display device.

2. The method of claim 1 wherein at least one of the bar codes is affixed to the product or to a container containing the product.

3. The method of claim 1 wherein the topic-specific information comprises one or more of installation information, registration information, warranty information, extended warranty information, trouble-shooting information, maintenance information, service information, specification information, update information, recall information, notice information, rebate information, coupon information, related-product information, incentive-program information, contest information, and discount information.

4. The method of claim 1 wherein the identifier is related with a Uniform Resource Locator (URL) in a relational database, the URL specifying the location of the corresponding information resource.

5. The method of claim 4 wherein the relational database resides on a remote computer.

6. The method of claim 5 wherein the remote computer sends the Uniform Resource Locator to a local computer which navigates to the corresponding information resource.

7. The method of claim 6 wherein the local computer navigates to the corresponding information resource automatically.

8. The method of claim 4 wherein the relational database resides on a local computer.

9. The method of claim 8 wherein the local computer navigates to the corresponding information resource automatically.

10. The method of claim 1 wherein the identifier is a Uniform Resource Locator which specifies the location of the corresponding information resource.

11. The method of claim 10 wherein the electronically-navigating step is performed automatically.

12. The method of claim 1 further comprising the step of electronically reading the bar code via a bar-code reader.

13. The method of claim 1 wherein the electronically-receiving, electronically-navigating, and displaying steps are performed using a local computer.

14. The method of claim 13 wherein the local computer includes a personal-digital-assistant device.

15. The method of claim 1 wherein at least one of the bar codes is associated with a human-readable topic-specific-information descriptor which describes the nature of the topic-specific information.

16. The method of claim 15 wherein the human-readable topic-specific-information descriptor comprises one or more of English, Japanese, French, and German.

17. An electronic network for obtaining, from a remote location, topic-specific information regarding a product, comprising:
    a computer which receives one of a plurality of bar codes associated with a product, each of the bar codes being associated with topic-specific information relating to the product, at least one of the bar codes for the product being associated with topic-specific information which is different from that of the other bar code or codes for the product, and each of the bar codes encoding an identifier which is associated with a corresponding information resource at a remote location, with at least one corresponding information resource including topic-specific information about the product which is different from that of the other corresponding information resource or resources;
    a remote location which includes the corresponding information resource, the resource being the resource associated with the identifier encoded by the bar code; and
    an electronic display device which displays the corresponding information resource's topic-specific information about the product.

18. The network of claim 17 wherein at least one of the bar codes is affixed to the product or to a container containing the product.

19. The network of claim 17 wherein the topic-specific information comprises one or more of installation information, registration information, warranty information, extended warranty information, trouble-shooting information, maintenance information, service information, specification information, update information, recall information, notice information, rebate information, coupon information, related-product information, incentive-program information, contest information, and discount information.

20. The network of claim 17 wherein the identifier is related with a Uniform Resource Locator (URL) in a relational database, the URL specifying the location of the corresponding information resource.

21. The network of claim 20 wherein the relational database resides on a remote computer.

22. The network of claim 21 wherein the remote computer sends the Uniform Resource Locator to a local computer which navigates to the corresponding information resource.

23. The network of claim 22 wherein the local computer navigates to the corresponding information resource automatically.

24. The network of claim 20 wherein the relational database resides on a local computer.

25. The network of claim 24 wherein the local computer navigates to the corresponding information resource automatically.

26. The network of claim 17 wherein the identifier is a Uniform Resource Locator which specifies the location of the corresponding information resource.

27. The network of claim 26 wherein the local computer navigates to the corresponding information resource automatically.

28. The network of claim 17 wherein a bar-code reader reads the bar code.

29. The network of claim 17 wherein the computer is a local computer which includes the electronic display device.

30. The network of claim 29 wherein the local computer includes a personal-digital-assistant device.

31. The network of claim 17 wherein the product is an audiovisual component.

32. The network of claim 17 wherein at least one of the bar codes is associated with a human-readable topic-specific-information descriptor which describes the nature of the topic-specific information.

33. The network of claim 32 wherein the human-readable topic-specific-information descriptor comprises one or more of English, Japanese, French, and German.

34. A method of obtaining, from a remote location, topic-specific information regarding a product, comprising the steps of:

electronically receiving one of a plurality of machine-readable codes associated with a product, each of the machine-readable codes being associated with topic-specific information relating to the product, at least one of the machine-readable codes further being associated with a human-readable topic-specific-information descriptor which describes the nature of the topic-specific information, at least one of the machine-readable codes being associated with topic-specific information which is different from that of the other machine-readable code or codes, and each of the machine-readable codes encoding an identifier which is associated with a corresponding information resource at a remote location, with at least one corresponding information resource including topic-specific information about the product which is different from that of the other corresponding information resource or resources;

electronically navigating to the corresponding information resource at the remote location, the resource being the resource associated with the identifier encoded by the machine-readable code; and displaying the corresponding information resource's topic-specific information about the product on an electronic display device.

35. An electronic network for obtaining, from a remote location, topic-specific information regarding a product, comprising:

a computer which receives one of a plurality of machine-readable codes associated with a product, each of the machine-readable codes being associated with topic-specific information relating to the product, at least one of the machine-readable codes further being associated with a human-readable topic-specific-information descriptor which describes the nature of the topic-specific information, at least one of the machine-readable codes being associated with topic-specific information which is different from that of the other machine-readable code or codes, and each of the machine-readable codes encoding an identifier which is associated with a corresponding information resource at a remote location, with at least one corresponding information resource including topic-specific information about the product which is different from that of the other corresponding information resource or resources;

a remote location which includes the corresponding information resource, the resource being the resource associated with the identifier encoded by the machine-readable code; and an electronic display device which displays the corresponding information resource's topic-specific information about the product.

* * * * *

UNITED STATES PATENT AND TRADEMARK OFFICE
CERTIFICATE OF CORRECTION

PATENT NO. : 7,055,737 B1  
APPLICATION NO. : 09/799227  
DATED : June 6, 2006  
INVENTOR(S) : Christopher M. Tobin et al.

Page 1 of 1

It is certified that error appears in the above-identified patent and that said Letters Patent is hereby corrected as shown below:

Column 3  
Lines 48-49, delete "electronically-receiving, electronically-navigating, and displaying steps may", insert --electronically-receiving-, electronically-navigating-, and displaying-steps may--.

Column 4  
Line 35, delete "user may, provide", insert --user may provide--.

Column 7  
Lines 15-16, Claim 1, delete "bar codes associated", insert --bar codes, associated--.

Signed and Sealed this  
Twenty-fifth Day of September, 2012

David J. Kappos  
*Director of the United States Patent and Trademark Office*